(12) United States Patent
Sadeghi et al.

(10) Patent No.: US 10,841,150 B2
(45) Date of Patent: Nov. 17, 2020

(54) CHANNEL BONDING AND BONDED CHANNEL ACCESS

(71) Applicant: Intel Corporation, Santa Clara, CA (US)

(72) Inventors: Bahareh Sadeghi, Portland, OR (US);
Thomas J. Kenney, Portland, OR (US);
Laurent Cariou, Portland, OR (US);
Ehud Reshef, Kiryat Tivon (IL); Ofer Hareuveni, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/422,275

(22) Filed: May 24, 2019

(65) Prior Publication Data

US 2019/0280919 A1     Sep. 12, 2019

Related U.S. Application Data

(60) Provisional application No. 62/728,633, filed on Sep. 7, 2018, provisional application No. 62/675,906, filed on May 24, 2018.

(51) Int. Cl.
| | |
|---|---|
| *H04L 12/24* | (2006.01) |
| *H04W 72/04* | (2009.01) |
| *H04L 29/08* | (2006.01) |
| *H04L 12/26* | (2006.01) |
| *H04L 27/26* | (2006.01) |
| *H04W 84/12* | (2009.01) |

(52) U.S. Cl.
CPC ...... *H04L 41/0803* (2013.01); *H04L 27/2627* (2013.01); *H04L 43/16* (2013.01); *H04L 69/323* (2013.01); *H04W 72/04* (2013.01); *H04W 84/12* (2013.01)

(58) Field of Classification Search
CPC ... H04L 41/0803; H04L 69/323; H04L 43/16; H04L 27/2627; H04L 43/00; H04L 43/50; H04L 27/2602; H04W 72/04; H04W 84/12; H04W 74/0808; H04W 24/00; H04B 3/46; H04B 17/00
See application file for complete search history.

(56) References Cited

U.S. PATENT DOCUMENTS

| | | | |
|---|---|---|---|
| 2019/0173636 A1* | 6/2019 | Yun | H04L 5/0023 |
| 2019/0260431 A1* | 8/2019 | Park | H04L 27/26 |
| 2020/0178299 A1* | 6/2020 | Yang | H04W 74/0808 |

* cited by examiner

*Primary Examiner* — Sharad Rampuria
(74) *Attorney, Agent, or Firm* — Schwegman Lundberg & Woessner, P.A.

(57) ABSTRACT

Apparatuses, methods, and computer readable media for channel bonding and bonded channel access. The apparatus comprising processing circuitry configured to: gain access to a first 10 MHz channel and to a second 10 MHz channel, and encode a physical layer (PHY) protocol data unit (PPDU) for transmission over a bonded channel, the bonded channel comprising the first 10 MHz channel and the second 10 MHz channel, where the PPDU is encoded to comprise a legacy preamble portion to be transmitted on the first 10 MHz channel and a repeated legacy preamble portion to be transmitted on the second 10 MHz channel, the PPDU further including a non-legacy portion, the non-legacy portion comprising a non-legacy signal field indicating a modulation and coding scheme (MCS) used to encode a data portion of the non-legacy portion, the data portion to be transmitted on the bonded channel.

17 Claims, 15 Drawing Sheets

US 10,841,150 B2

CHANNEL BONDING AND BONDED CHANNEL ACCESS

PRIORITY CLAIM

This application claims the benefit of priority under 35 USC 119(e) to U.S. Provisional Patent Application Ser. No. 62/675,906, filed May 24, 2018, and U.S. Provisional Patent Application Ser. No. 62/728,633, filed Sep. 7, 2018, both of which are incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11bd and/or Vehicle-to-Everything (V2X). Some embodiments relate to methods, computer readable media, and apparatus for channel bonding and bonded channel access.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
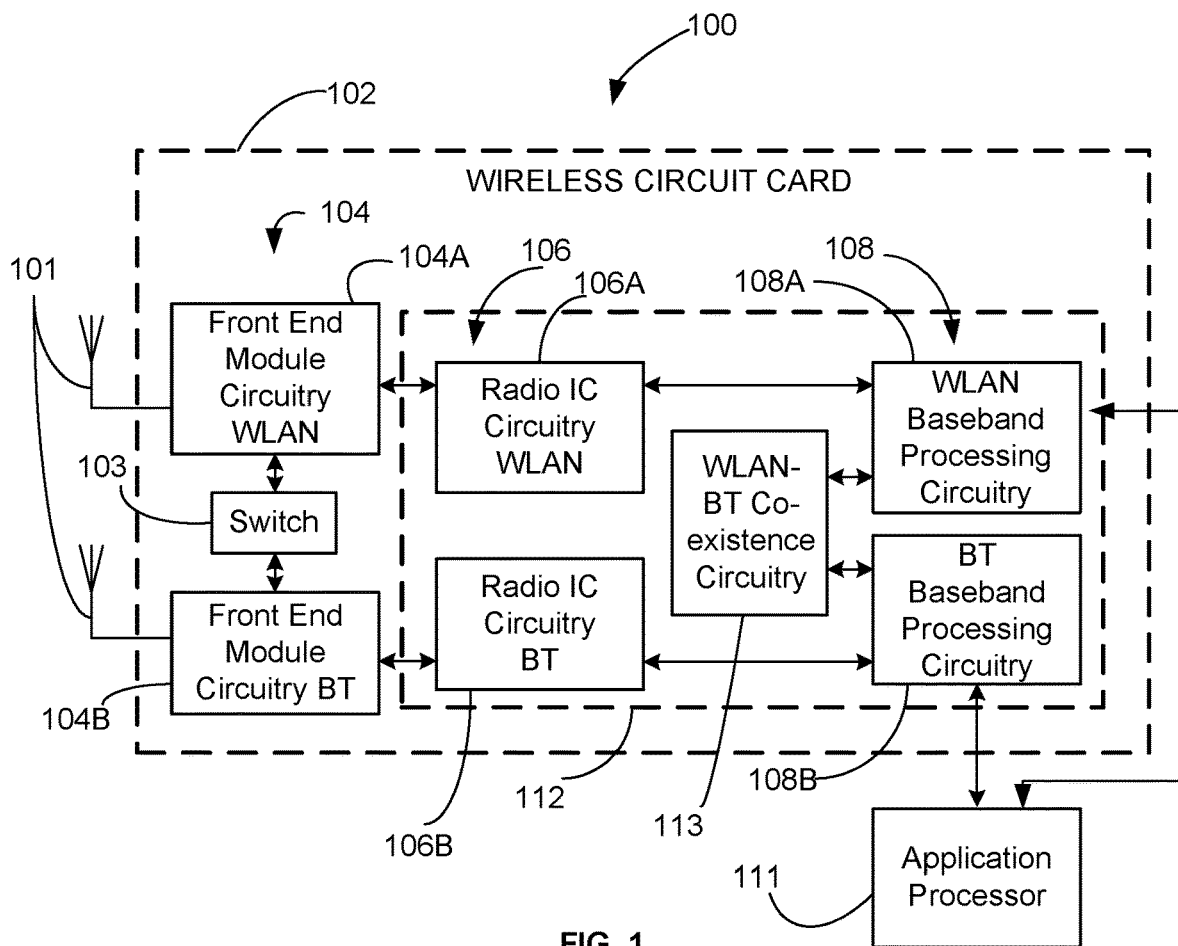
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT or Cellular V2x (C-V2X) coexistence circuitry 113 may include logic providing an interface between the WLAN baseband circuitry 108A and the BT baseband circuitry 108B to enable use cases requiring WLAN and BT coexistence.

In some embodiments, the 5 GHz/6 GHz Unlicensed band where Wi-Fi operates is adjacent to 5.9 GHz where IEEE 802.11p/IEEE 802.11bd operates. In some embodiments, the circuitry 113 is configured for coexistence among Wi-Fi operating in 5.9 GHz (IEEE 802.11p/IEEE 802.11bd), Wi-Fi operating in 2.4/5 GHz (e.g., IEEE 802.11n/ac/ax), and Cellular V2X solutions (also operating in 5.9 GHz.)

In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. For example, an On-board units (OBU) or Road Side Unit (RSU) of IEEE 802.11p/bd. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, IEEE 802.11ad, IEEE 802.11ay, IEEE 802.11p, and/or WiGig standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11p/bd. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, 5.9 GHz (bandwidths of 10, 20, 30, 40, 50, 60, or 70 Mhz), and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however. In some embodiments, a 2.16 GHz channel may be used. In some embodiments, there may be a primary 2.16 GHz channel and one or more secondary 2.16 GHz channels. In some embodiments, one or more of the 2.16 GHz channels that are adjacent may be bonded together.

Figure 2:
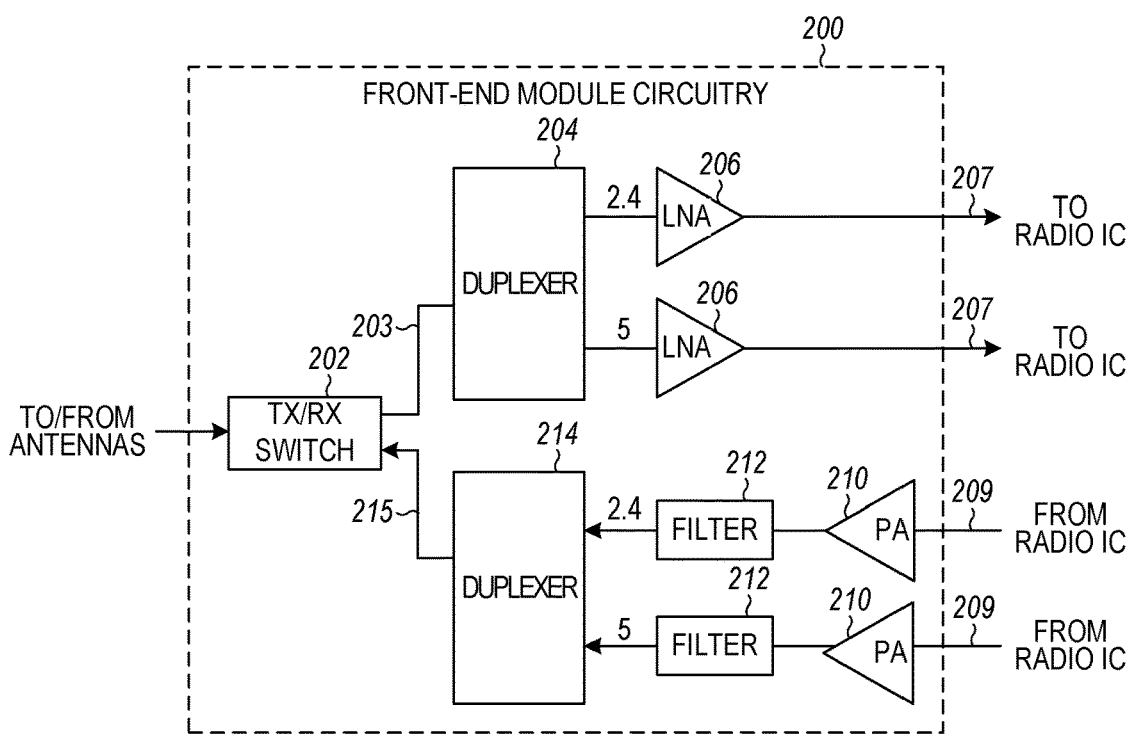
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum, the 5 GHz frequency spectrum, the 5.9 GHz frequency spectrum, or the 60 GHz spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
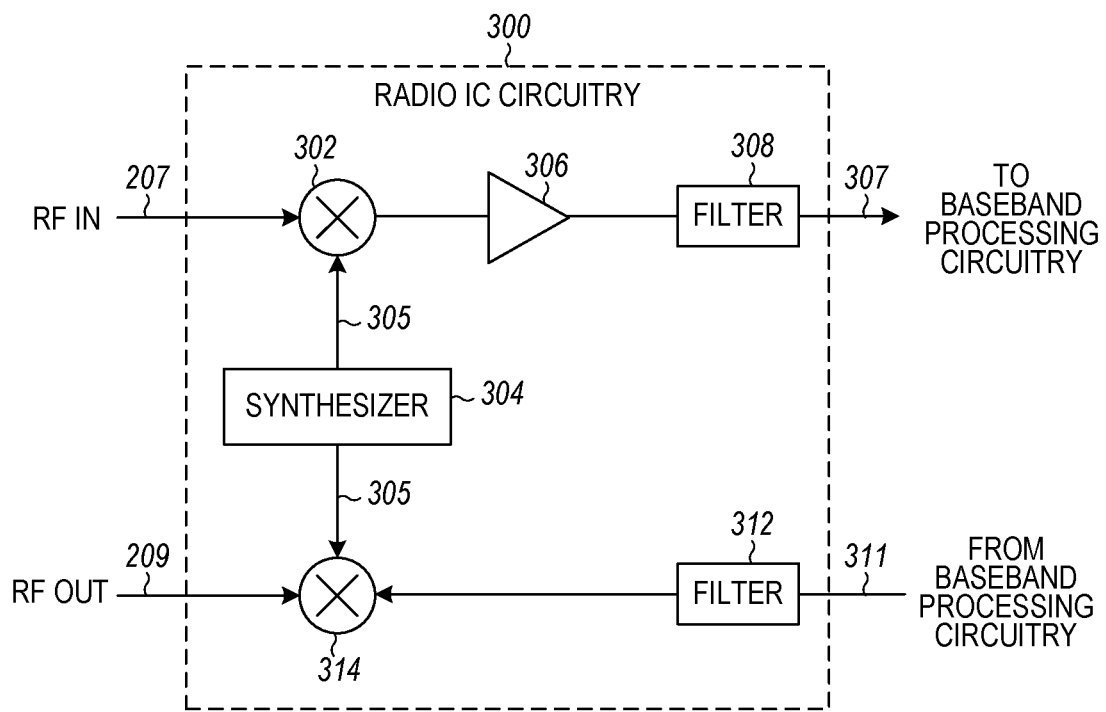
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct downconversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($F_{LO}$).

Figure 4:
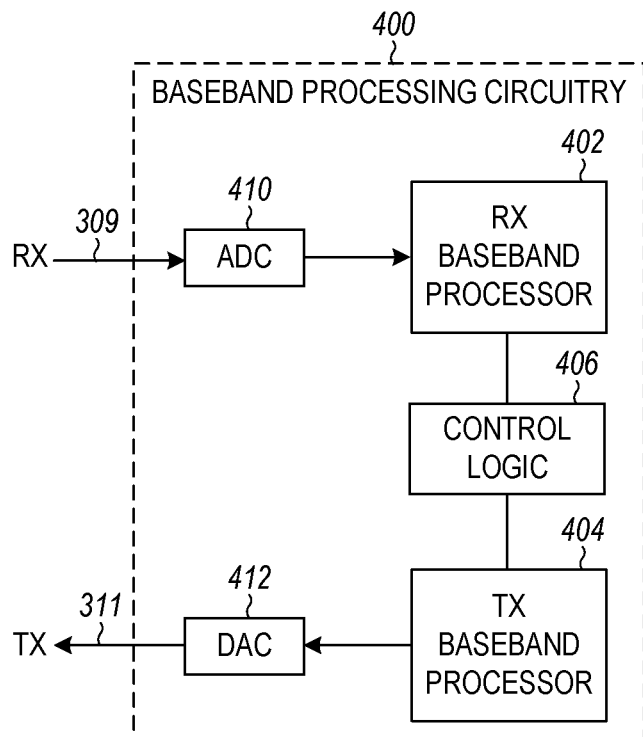
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
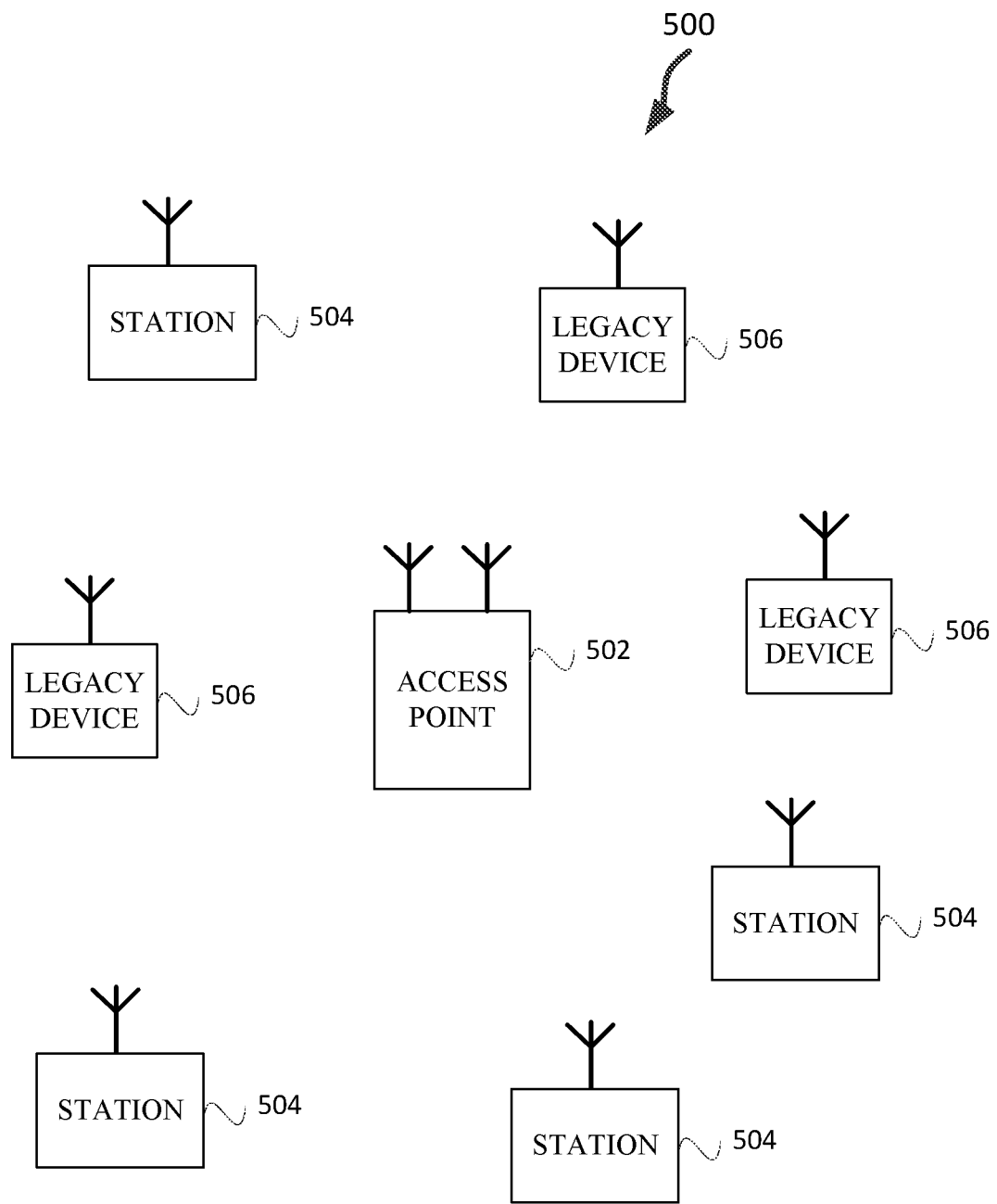
FIG. 5 illustrates a WLAN in accordance with some embodiments.

FIG. 5 illustrates a WLAN 500 in accordance with some embodiments. The WLAN may comprise a basis service set (BSS) or personal BSS (PBSS) 500 that may include an access point (AP) 502, which may be an AP or a station acting as a PB SS control point (PCP), stations 504 (e.g., IEEE 802.11bd), and legacy devices 506 (e.g., IEEE 802.11a/n/ac/ad/p/j/p). In IEEE 802.11p and IEEE 802.11bd, the AP 502 and/or STA 504 may operate in Out of Context of BSS (OCB) mode, where the is no AP 502 coordinating the communications and the STA 504 broadcast the messages (PPDUs) for all other STAs 504 (or APs 502) nearby to here.

In some embodiments, the access point 502 and/or stations 504 may be IEEE 802.11bd and/or Vehicle-to-Everything (V2X). In some embodiments, the legacy devices 506 may be wireless devices. The AP 502, STA 504, and/or legacy devices 506 may be part of a wireless structure for vehicles. The AP 502, STA 504, and/or legacy devices 506 may be configured to operate in accordance with next generation vehicle (NGV). NGV may be termed IEEE 802.11bd. Additionally, NGV and/or IEEE 802.11bd may be given different names.

The AP 502 may be an AP configured to transmit and receive in accordance with one or more IEEE 802.11 communication protocols, IEEE 802.11ax, IEEE 802.11ay, IEEE 802.11bd (Vehicle-to-Everything (V2X). In some embodiments, the access point 502 is a base station. The access point 502 may be part of a PBSS. The access point 502 may use other communications protocols as well as the IEEE 802.11 protocol. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIMO), multi-user (MU) MIMO (MU-MIMO), and/or single-input single-output (SISO). The access point 502 and/or station 504 may be configured to operate in accordance with Next Generation 60 (NG60), WiFi Gigabyte (WiGiG), IEEE 802.11ay, IEEE 80211a/b/n/ac/ad/g/p, and/or IEEE 802.11bd.

The legacy devices 506 may operate in accordance with one or more of IEEE 802.11 a/b/g/n/ac/ad/af/ah/aj/p, or another legacy wireless communication standard. The legacy devices 506 may be IEEE 802 stations. The stations 504 may be wireless transmit and receive devices such as vehicles, and road side units, cellular telephone, smart telephone, handheld wireless device, wireless glasses, wireless watch, wireless personal device, tablet, or another device that may be transmitting and receiving using the IEEE 802.11 protocol such as IEEE 802.11p/ay/ax/bd or another wireless protocol. The stations 504 and/or access point 502 may be attached to a BSS or may operate outside the context of BSS 100. The access point 502 may be a station 504 taking the role of the PCP.

The access point 502 may communicate with legacy devices 506 in accordance with legacy IEEE 802.11 communication techniques. The STA 504 may communicate with one another using legacy communication protocols, e.g., IEEE 802.11p. In example embodiments, the access point 502 may also be configured to communicate with stations 504 in accordance with legacy IEEE 802.11 communication techniques. The access point 502 may use techniques of 802.11ad for communication with legacy devices 106. The access point 502 and/or stations 504 may be a personal basic service set (PBSS) Control Point (PCP) which can be equipped with large aperture antenna array or Modular Antenna Array (MAA).

The access point 502 and/or stations 504 may be equipped with more than one antenna. Each of the antennas of access point 502 and/or stations 504 may be a phased array antenna with many elements. In some embodiments, an IEEE 802.11ay frame may be configurable to have the same bandwidth as a channel. In some embodiments, the access point 502 and/or stations 504 may be equipped with one or more directional multi-gigabit (DMG) antennas or enhanced DMG (EDMG) antennas, which may include multiple radio-frequency base band (RF-BB) chains. The access point 502 and/or stations 504 may be configured to perform beamforming and may have an antenna weight vector (AWV) associated with one or more antennas. In some embodiments, the AP 502 and/or stations 504 may be a EDMG AP 502 or EDMG station 504, respectively. In some embodiments, the access point 502 and/or STA 504 may transmit a frame, e.g., a PPDU.

An IEEE 802.11bd frame may be configured for transmitting a number of spatial streams, which may be in accordance with MU-MIMO. In other embodiments, the AP 502, stations 504, and/or legacy devices 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies. In some embodiments, the AP 502 and/or stations 504 may be configured to implement more than one communications protocols, which may be collocated in the same device. The two or more communications protocols may use common or separate components to implement the communications protocols.

In accordance with some IEEE 802.11bd embodiments, an STA 504 (or AP 502) may be arranged to contend for a wireless medium (e.g., during a contention period) to receive exclusive control of the medium, which may be termed a transmission opportunity (TxOP) for performing beamforming training for a multiple access technique such as OFDMA or MU-MIMO. In some embodiments, the multiple-access technique used during a TxOP may be a scheduled OFDMA technique, although this is not a requirement. In some embodiments, the multiple access technique may be a space-division multiple access (SDMA) technique. The AP 502 may communicate with legacy stations 506 and/or stations 504 in accordance with legacy IEEE 802.11 communication techniques. In some embodiments, AP 502 may be a STA 504 operating as an AP.

In example embodiments, the radio architecture of FIG. 5, the front-end module circuitry of FIG. 2, the radio IC circuitry of FIG. 3, and/or the base-band processing circuitry of FIG. 4 may be configured to perform the methods and functions herein described in conjunction with FIGS. 1-17.

In example embodiments, the stations 504, an apparatus of the stations 504, the access point 502, and/or an apparatus of an access point 502, may include one or more of the following: the radio architecture of FIG. 1, the front-end module circuitry of FIG. 2, the radio IC circuitry of FIG. 3, and/or the base-band processing circuitry of FIG. 4.

In example embodiments, the stations 504, apparatuses of the stations 504, the access points 502, and/or apparatuses of the access point 502, are configured to perform the methods and functions described herein in conjunction with FIGS. 1-17. The term Wi-Fi may refer to one or more of the IEEE 802.11 communication standards. AP may refer to an access point 502. STA may refer to a station 504 and/or a legacy device 506.

Figure 6:
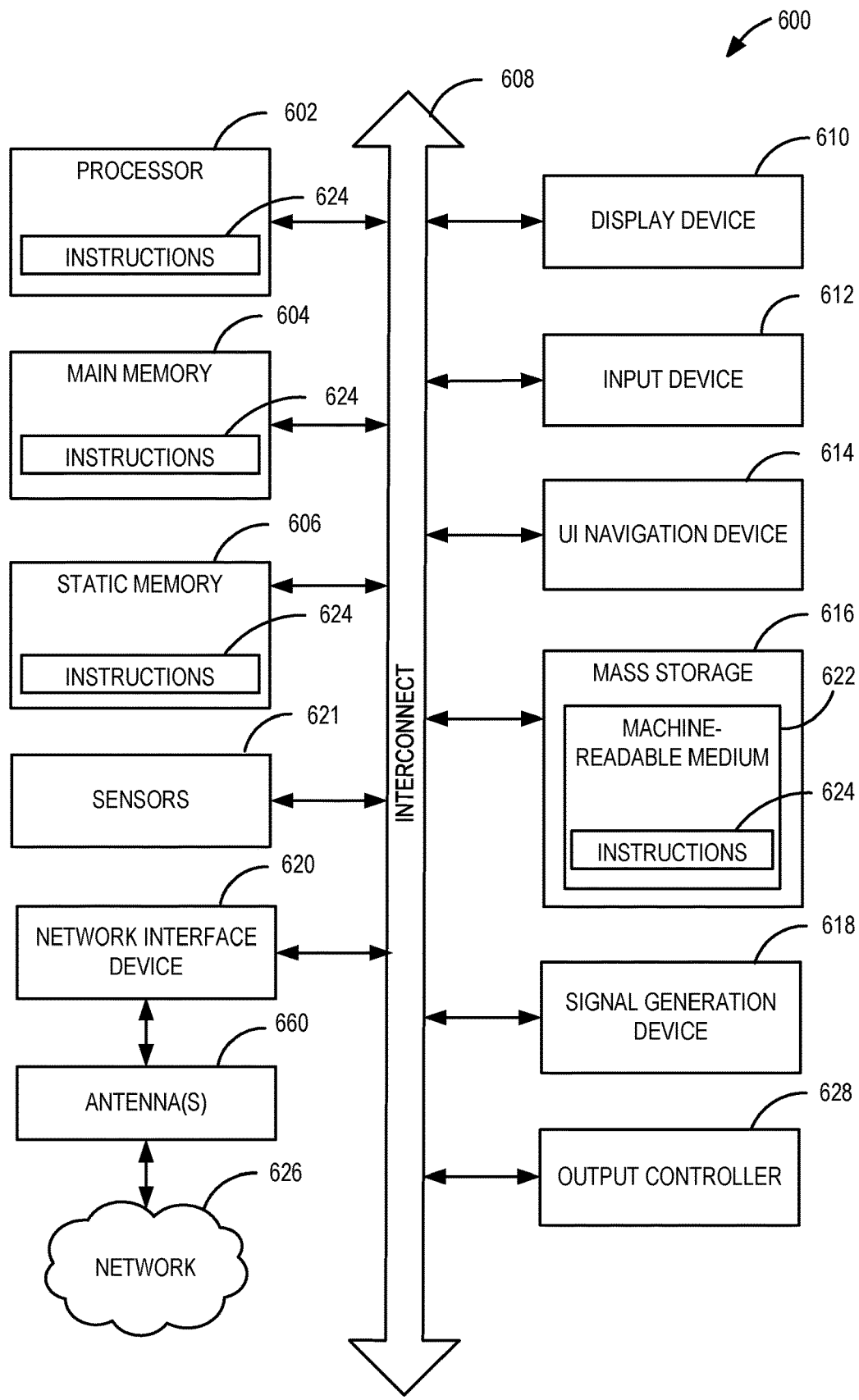
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a access point 502, HE station 104, personal computer (PC), a vehicle, roadside unit, a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise one or more of physical layer circuitry, MAC layer circuitry, processing circuitry, and/or transceiver circuitry. In some embodiments, the processing circuitry may include one or more of the processor 602, the instructions 624, physical layer circuitry, MAC layer circuity, and/or transceiver circuitry. The processor 602, instructions 624, physical layer circuitry, MAC layer circuity, processing circuitry, and/or transceiver circuitry may be configured to perform one or more of the methods and/or operations disclosed herein.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

In some embodiments, an apparatus used by the station 500 may include various components of the station 504 as shown in FIG. 5 and/or the example machines 100, 200, 300, or 600. Accordingly, techniques and operations described herein that refer to the station 504 may be applicable to an apparatus of the station 504, in some embodiments. It should also be noted that in some embodiments, an apparatus used by the AP 502 may include various components of the AP 502 as shown in FIG. 5 and/or the example machine 100, 200, 300, or 600. Accordingly, techniques and operations described herein that refer to the AP 502 may be applicable to an apparatus for an AP, in some embodiments.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware. Accordingly, apparatuses, devices, and operations described herein that refer to the station 504 and/or AP 502 may be applicable to an apparatus for the station 504 and/or AP 502.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), WAVE protocol, etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.6.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
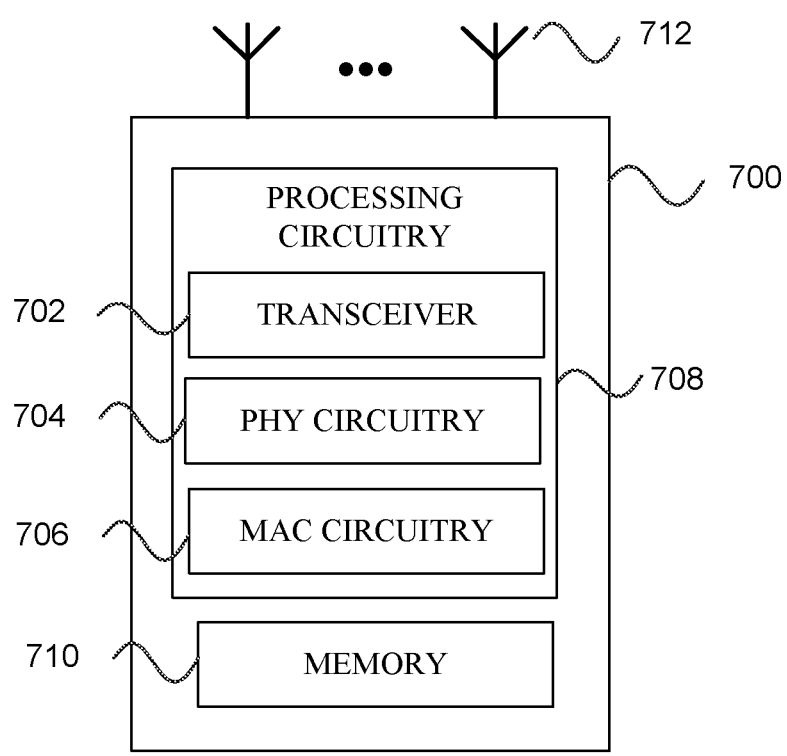
FIG. 7 illustrates a block diagram of an example wireless device 700 upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g. IEEE 802.11bd STA 504, AP 502, STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., IEEE 802.11bd STA, AP 502 and/or STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a TXOP and encode or decode a IEEE 802.11bd PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit an IEEE 802.11bd PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the stations 504 of FIG. 5 or wireless device 700) and an access point (e.g., the AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
FIG. 8 illustrates a channelization, in accordance with some embodiments.

FIG. 8 illustrates a channelization 800, in accordance with some embodiments. Illustrated in FIG. 8 is frequency 810, channel number 812, channel usage 814, guard band (G) 804, channels 802. The frequency 810 indicates the frequency 810 across a frequency range. The guard band (G) 804 is from frequency 5850 MHz to 5855 MHz. The channel number 812 indicates a channel number 812 assigned to a channel 802. For example, channel 802.1 is assigned channel number 812 of 172. Channel usage 814 indicates a usage of the channels 802 in accordance with some embodiments. For example, channel 802.1 (channel number 812 of 172) has a usage of service channel (SCH) and channel 802.1 (channel number 812 of 178) has a channel usage 814 of control channel (CCH). In some embodiments, channel 802.5 (channel number 812 of 178) is reserved for control services. In some embodiments, channel 802.5 (channel number 812 of 178) is not reserved for control services.

Channels 802.1, 802.2, 802.3, 802.5, 802.6, 802.7, and 802.9 are 10 MHz channels. Channels 802.4 and 802.8 are 20 MHz channels. Channel 802.4 may be channels 802.2 and 802.3 bonded. Channel 802.8 may be channels 802.6 and 802.7 bonded.

In some embodiments, the channelization 800 may be used for Dedicated Short Range Communications (DSRC). In some embodiments, a DSRC band of 5.9 GHz (5.85-5.925 GHz) is reserved for vehicle communications, e.g., vehicle to everything (V2X), vehicle to infrastructure (V2I), vehicle to network (V2N), vehicle to vehicle (V2V), vehicle to pedestrian (V2P), vehicle-to-device (V2D), and vehicleto-grid (V2G). The channelization 800 of FIG. 8 may be used for one or more of the communications as disclosed herein.

In some embodiments, the channelization 800 may be used by IEEE 802.11p and/or IEEE 802.11bd. In some embodiments, AP 502, STA 504, and/or legacy device 506 are configured to operate in accordance with IEEE 802.11p where the physical layer (PHY) is the same or similar as the PHY of IEEE 802.11a, i.e., 20 MHz, single input single output (SISO), but with the difference that it is downclocked by 2 in order to operate in a 10 MHz channel, e.g., channels 802.1, 802.2, 802.3, 802.5, 802.6, 802.7, and 802.9.

In some embodiments, the media access control (MAC) portion of IEEE 802.11p enables the AP 502, STA 504, and/or legacy devices 506, to transmit out of context of a BSS 500 (OCB). The OCB transmissions (e.g., PPDUs) enables the vehicles (e.g., a vehicle that includes one or more of AP 502, STA 504, and/or legacy device 506) to broadcast safety messages without associating with a BSS (e.g., 500). The format of the safety messages and their content may be as defined in IEEE 1609 and Society of Automotive Engineers (SAE) specifications, respectively. In IEEE 1609, to endure all vehicles receive high priority safety related messages there is a dedicated control channel (CCH), e.g., channel 802.5 of FIG. 8. In some embodiments, the messages of IEEE 1609 are in accordance with wireless access in vehicular environments (WAVE) short message protocol (WSMP), which may be a message protocol that runs over IEEE 802.11p. In some embodiments, AP 502, STA 504, and/or legacy devices 506 to operate in accordance with WSMP.

In some embodiments, the AP 502, STA 504, and/or legacy devices 506, may be configured to operate in accordance with one or more cellular based protocols. In some embodiments, the AP 502, STA 504, and/or legacy devices 506 are configured to operate IEEE 802.11 bd in accordance with MIMO, higher MCSs than IEEE 802.11p, Low-density parity-check (LDPC), extended range Dual Sub-Carrier Modulation (DCM), Space-time block code (STBC), midambles, and traveling pilots.

In some embodiments, IEEE 802.11p uses only the 10 MHz channels 802 of FIG. 8. In some embodiments, using bonded channels or 20 MHz channels, e.g., 802.4, which has a channel number 812 of 175 or 802.8, which has a channel number 812 of 181, may interfere with legacy device 506 and/or devices using legacy protocols such as IEEE 802.11p. In some embodiments, AP 502 and/or STA 504 are configured to bond one or more channels 802. In some embodiments, AP 502, STA 504, and/or legacy devices 506 are configured to bond one or more channels 802 where the channels are not contiguous.

Figure 9:
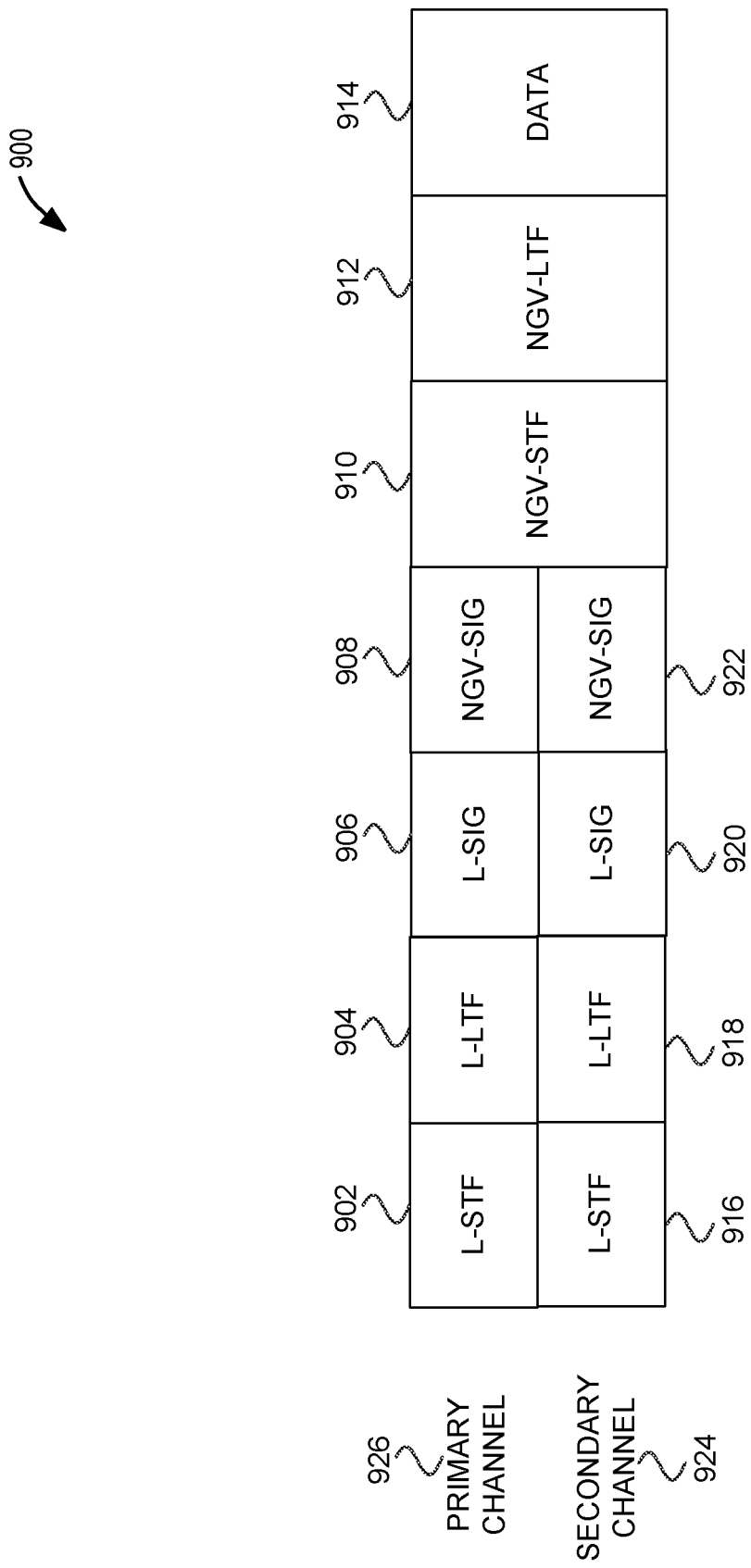
FIG. 9 illustrates a physical layer (PHY) protocol data unit (PPDU), in accordance with some embodiments.

FIG. 9 illustrates a physical layer (PHY) protocol data unit (PPDU) 900, in accordance with some embodiments. The PPDU 900 may be a NGV (or IEEE 802.11bd) PPDU. The PPDU 900 may include be transmitted over a bonded 20 MHz channel comprising primary channel 926 and secondary channel 924. The primary channel 926 and secondary channel 924 may each be a 10 MHz channel 802 as disclosed in conjunction with FIG. 8.

The PPDU 900 may include a portion that is repeated for each 10 MHz channel, e.g., as illustrated in FIG. 9, legacy short-training field (L-STF) 902, 916, legacy long-training field (L-LTF) 904, 918, legacy signal field (L-SIG) 906, 920, and NGV-SIG 908, 922. One or more of the fields L-STF 902, 916, L-LTF 904, 918, L-SIG 906, 920 may be the same or similar as a legacy field, e.g., IEEE 802.11p. The PPDU 900 may further comprise a portion that is transmitted over the entire bonded channel, primary channel 926 and second channel 924. For example, as illustrated in FIG. 9, the PPDU 900 may include a NGV-STF 910, NGV-LTF 912, and a data field 914. There may be one or more additional fields not illustrated. One or more of the fields may be optional.

The PPDU 900 may include a legacy, e.g., IEEE 802.11p, compatible preamble, e.g., L-STF 902, 916, L-LTF 904, 918, L-SIG 906, 920, which is 10 MHz wide and is duplicated over the two bonded channels (e.g., primary channel 926, and secondary channel 924). The PPDU 900 then follows the legacy compatible preamble with a new non-legacy compatible preamble, e.g., NGV-SIG 908, 922, which is 10 MHz wide and duplicated on each 10 MHz channel. The data field 914 is transmitted over the bonded channel (20 MHz), primary channel 926 and secondary channel 924. In some embodiments, the PPDU 900 is the same or similar to a IEEE 802.11n or IEEE 802.11ac PPDU downclocked by two.

In some embodiments, NGV-SIG 908, 922 comprise a bandwidth field that indicates the bandwidth which is used by the PPDU 900, e.g., as illustrated 20 MHz. In some embodiments, the NGV-SIG 908, 922 may be the same or similar to a HT-SIG or VHT-SIG. In some embodiments, L-STFs 902, 916, L-LTFs 904, 918, L-SIGs 906, 920, and NGV-SIG 908, 922 may be transmitted to be compatible with legacy devices, e.g., IEEE 802.11p. NGV-STF 910, NGV-LTF 912, and data 914 may be modulated in accordance with indications of modulation in NGV-SIGs 908, 922.

Figure 10:
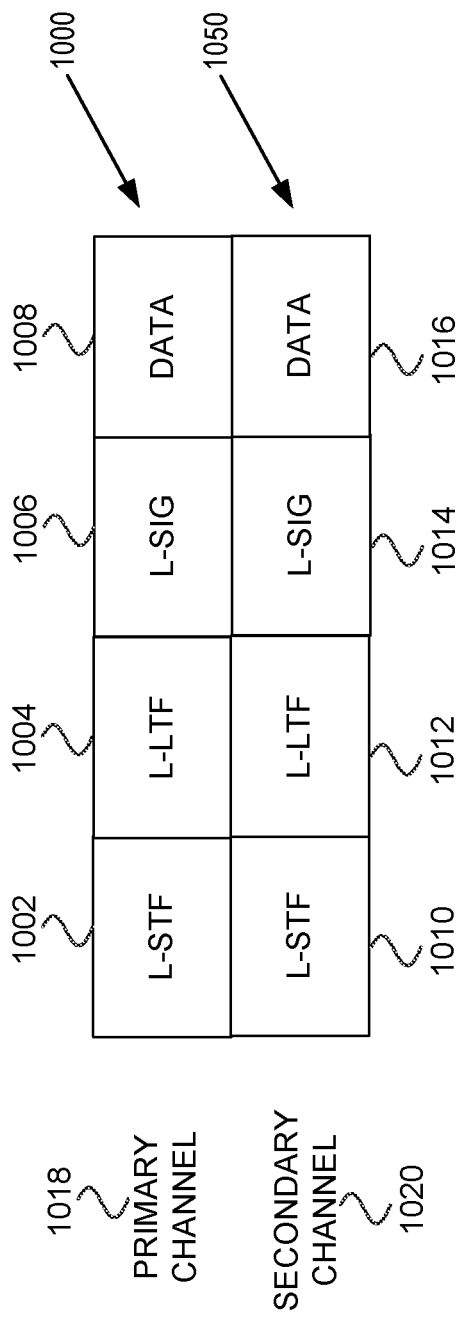
FIG. 10 illustrates a PPDU format, in accordance with some embodiments.

FIG. 10 illustrates a PPDU format 1000, 1050, in accordance with some embodiments. PPDUs 1000, 1050 may be NGV (or IEEE 802.11bd) PPDUs. PPDUs 1000, 1050 may be transmitted over a bonded 20 MHz channel comprising primary channel 1018 and secondary channel 1020. The primary channel 1018 and secondary channel 1020 may each be a 10 MHz channel 802 as disclosed in conjunction with FIG. 8. PPDU 1000, 1050 may include the same fields and may be transmitted within a 10 MHz channel, e.g., primary channel 1018 and secondary channel 1020. In some embodiments, the primary channel 1018 and secondary channel 1020 do not have to be contiguous.

PPDUs 1000, 1050 may include L-STFs 1002, 1010, L-LTFs 1004, 1012, L-SIGs 1006, 1014, and data field 1008, 1016, respectively. L-STFs 1002, 1010, L-LTFs 1004, 1012, and L-SIGs 1006, 1014 may be the same or similar as disclosed in conjunction with FIG. 9. PPDUs 1000, 1050 may include one or more additional fields. The data fields 1008, 1016 may comprise different data. In some embodiments, the bonded channel may not be contiguous, e.g., channel 802.1 and channel 802.5. The PPDUs 1000, 1050 may be compatible with IEEE 802.11p and/or other legacy communication protocols. The AP 502 and/or STA 504 may be configured to transmit PPDUs 1000, 1050 on separate channels 802. In some embodiments, the PPDUs 1000, 1050 may be IEEE 802.11p duplicative PPDUs.

Figure 11:
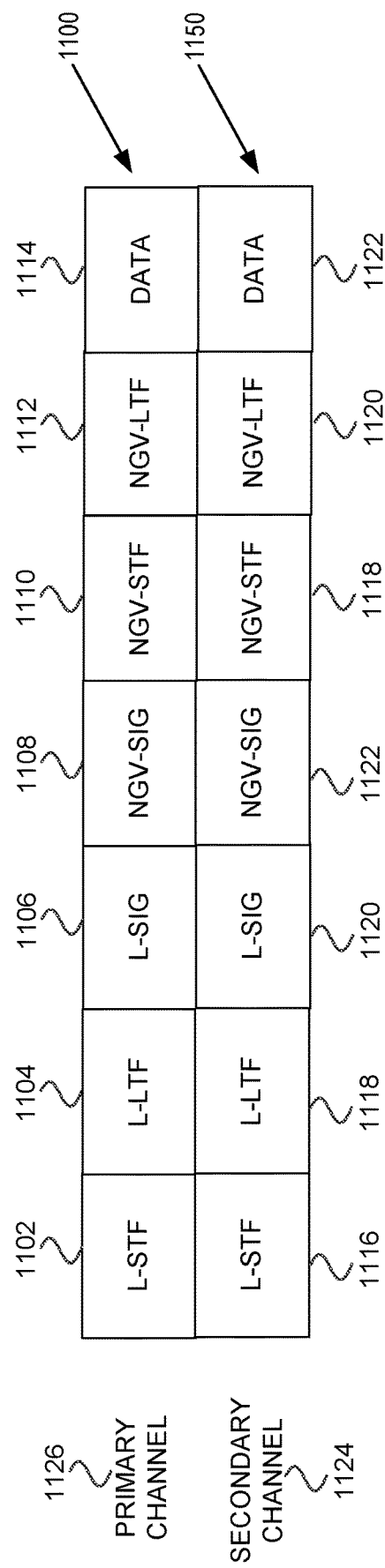
FIG. 11 illustrates a PPDU format, in accordance with some embodiments.

FIG. 11 illustrates a PPDU format 1100, 1150, in accordance with some embodiments. PPDUs 1100, 1150 may be NGV (or IEEE 802.11bd) PPDUs. PPDUs 1100, 1150 may be transmitted over a bonded 20 MHz channel comprising primary channel 1126 and secondary channel 1124. The primary channel 1126 and secondary channel 1124 may each be a 10 MHz channel 802 as disclosed in conjunction with FIG. 8. PPDU 1100, 1150 may include the same fields and may be transmitted within a 10 MHz channel, e.g., primary channel 1126 and secondary channel 1124. In some embodiments, the primary channel 1126 and secondary channel 1124 do not have to be contiguous.

PPDUs 1100, 1150 may include L-STFs 1102, 1016, L-LTFs 1004, 1012, L-SIG 1006, 1014, NGV-SIGs 1108, 1122, NGV-STFs 1110, 1118, NGV-LTF 1112, 1120, and data fields 1114, 1122, respectively. L-STFs 1102, 1010, a L-LTFs 1004, 1012, and L-SIG 1006, 1014 may be the same or similar as disclosed in conjunction with FIG. 9. NGV-SIG 1108, 1122 may indicate a modulation and coding scheme for NGV-STF 1110, 1118, NGV-LTF 1112, 1120, and data 1114, 1122. In some embodiments, NGV-SIG 1108, 1122 may include an indication of a type of channel bonding that is used, e.g., separate modulation on separate channels or modulation on a bonded channel. The data fields 1114, 1122 may comprises different data. Legacy devices 506 may be able to decode L-STF 1102, 1116, L-LTF 1104, L-LTF 1118, and L-SIG 1106, 1120, and thus be able to defer based on a length indicated in L-SIG 1106, 1120.

PPDUs 1100, 1150 may include one or more additional fields. In some embodiments, the bonded channel (e.g., primary channel 1126, secondary channel 1124) may not be contiguous, e.g., channel 802.1 and channel 802.5.

In some embodiments, L-STFs 1102, 1016, L-LTFs 1004, 1012, and L-SIG 1006, 1014 may be transmitted to be compatible with legacy devices, e.g., IEEE 802.11p. NGV-STF 910, NGV-LTF 912, and data 914 may be modulated in accordance with indications of modulation in NGV-SIGs 908, 922.

Figure 12:
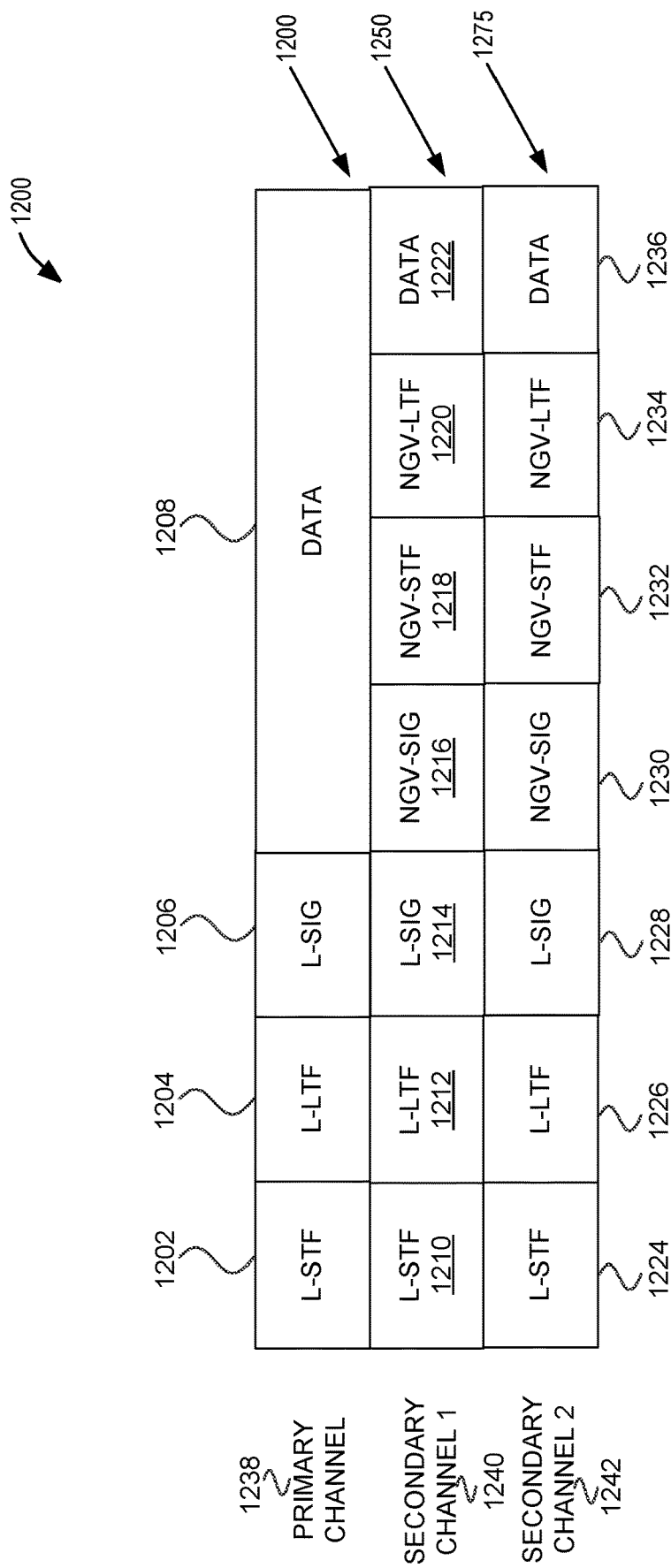
FIG. 12 illustrates a PPDU format, in accordance with some embodiments.

FIG. 12 illustrates a PPDU format 1200, 1250, 1275, in accordance with some embodiments. PPDUs 1200, 1250, 1275 may be NGV (or IEEE 802.11bd) PPDUs. PPDUs 1200, 1250, 1275 may be transmitted over a bonded 30 MHz channel comprising primary channel 1238, secondary channel 1 1240, secondary channel 2 1242. In some embodiments, the all seven channels 802 may be bonded (total of 70 MHz). The primary channel 1238, secondary channel 1 1240, secondary channel 2 1242 may each be a 10 MHz channel 802 as disclosed in conjunction with FIG. 8. PPDU 1250, 1275 may include the same fields and may be transmitted within a 10 MHz channel, e.g., secondary channel 1 1224 and secondary channel 2 1224, respectively. In some embodiments, the primary channel 1238, secondary channel 1 1240, secondary channel 2 1242 do not have to be contiguous.

PPDU 1200 may include L-STF 1202, L-LTF 1204, L-SIG 1206, and data field 1208, which may be similar or the same as disclosed in conjunction with FIG. 10. PPDUs 1250, 1275 may include L-STFs 1210, 1224, L-LTFs 1212, 1226, L-SIGs 1214, 1228, NGV-SIGs 1216, 1230, NGV-STFs 1218, 1232, NGV-LTFs 1220, 1234, and data fields 1222, 1236, respectively. L-STFs 1210, 1224, L-LTFs 1212, 1226, L-SIGs 1214, 1228, NGV-SIGs 1216, 1230, NGV-STFs 1218, 1232, NGV-LTFs 1220, 1234, and data fields 1222, 1236 may be the same or similar as disclosed in conjunction with FIG. 11.

In some embodiments, L-STFs 1202, 1210, 1224, L-LTFs 1204, 1212, 1226, and L-SIG 1206, 1214, 1228, may be transmitted to be compatible with legacy devices, e.g., IEEE 802.11p. NGV-STF 1218, 1232, NGV-LTF 1220, 1234, and data fields 1222, 1236 may be modulated in accordance with indications of modulation in NGV-SIGs 1216, 1230.

Figure 13:
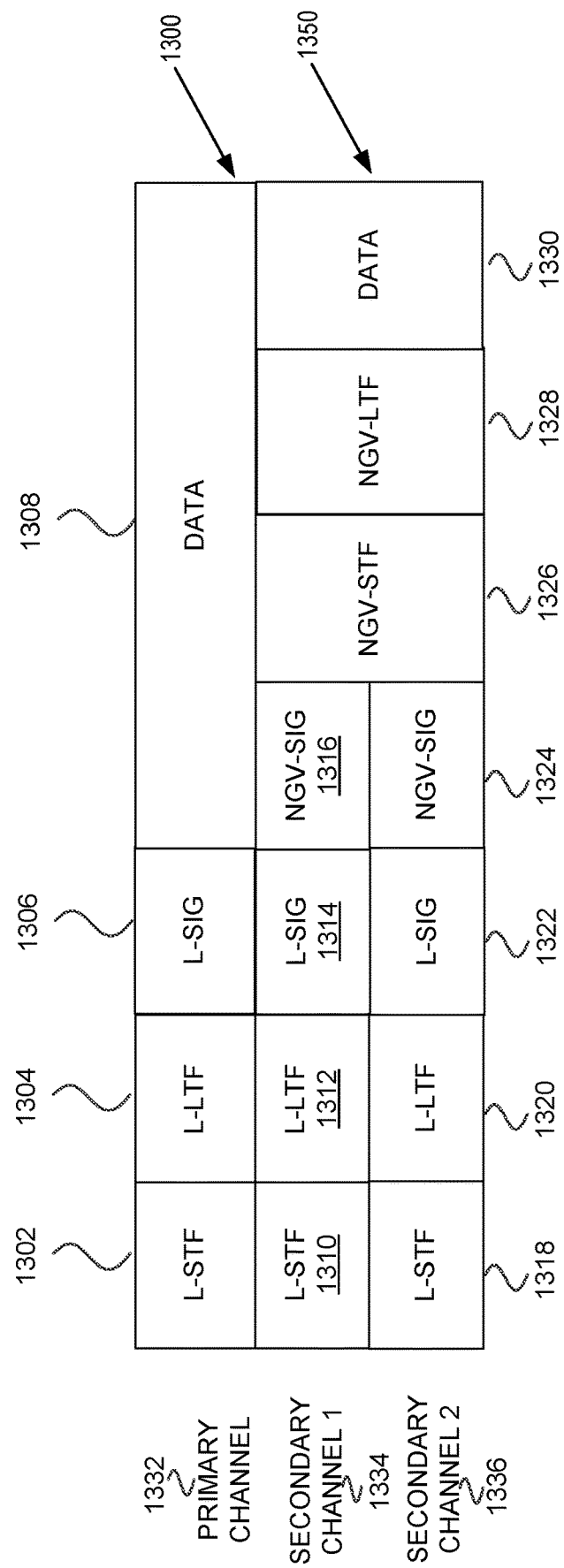
FIG. 13 illustrates a PPDU format, in accordance with some embodiments.

FIG. 13 illustrates a PPDU format 1300, 1250, in accordance with some embodiments. PPDUs 1300, 1350 may be NGV (or IEEE 802.11bd) PPDUs. PPDUs 1300, 1250 may be transmitted over a bonded 30 MHz channel comprising primary channel 1332, secondary channel 1 1334, secondary channel 2 1336. In some embodiments, all seven of the channels 802 may be bonded (total of 70 MHz.) The primary channel 1332, secondary channel 1 1334, secondary channel 2 1336 may each be a 10 MHz channel 802 as disclosed in conjunction with FIG. 8. PPDU 1350 may be transmitted within a 20 MHz channel, e.g., secondary channel 1 1224 and secondary channel 2 1224, with the fields L-STF 1310, L-LTF 1312, 1320, L-SIG 1314, 1322, and NGV-SIG 1316, 1324, repeated on each 10 MHz channel. In some embodiments, the primary channel 1332, secondary channel 1 1334, secondary channel 2 1336 do not have to be contiguous. In some embodiment, secondary channel 1 1334 and secondary channel 2 1336 have to be contiguous.

PPDU 1300 may include L-STF 1306, L-LTF 1308, L-SIG 1310, and data field 1312, which may be similar or the same as disclosed in conjunction with FIG. 10. PPDU 1350, may include L-STF 1310, L-LTF 1312, 1320, L-SIG 1314, 1322, and NGV-SIG 1316, 1324, NGV-STFs 1326, NGV-LTFs 1328, and data field 1330. L-STF 1310, L-LTF 1312, 1320, L-SIG 1314, 1322, and NGV-SIG 1316, 1324, NGV-STFs 1326, NGV-LTFs 1328, and data field 1330 may be the same or similar as disclosed in conjunction with FIG. 9.

In some embodiments, L-STFs 1302, 1310, 1318, L-LTFs 1304, 1312, 1320, L-SIG 1306, 1314, 1322, data field 1308, may be transmitted to be compatible with legacy devices, e.g., IEEE 802.11p. NGV-STF 1326, NGV-LTF 1328 and data field 1330 may be modulated in accordance with indications of modulation in NGV-SIGs 1316, 1324. NGV-SIGs 1316, 1324 may be modulated in accordance with legacy communication protocols.

The terms primary channel, secondary channel, secondary channel 1, and secondary channel 2 are used in FIGS. 9-13. The channels refer to channels 802 as disclosed in FIG. 8. One or more of the channels may be assigned to specific channels by the communication protocol, e.g., IEEE 802.11bd or NGV, in accordance with some embodiments. One or more of the channels may be dynamically assigned based on communications between the AP 502 and/or STA (s) 504, in accordance with some embodiments. One or more of the channels may be dynamically assigned based on the NGV SIG as disclosed in conjunction with FIG. 14.

Figure 14:
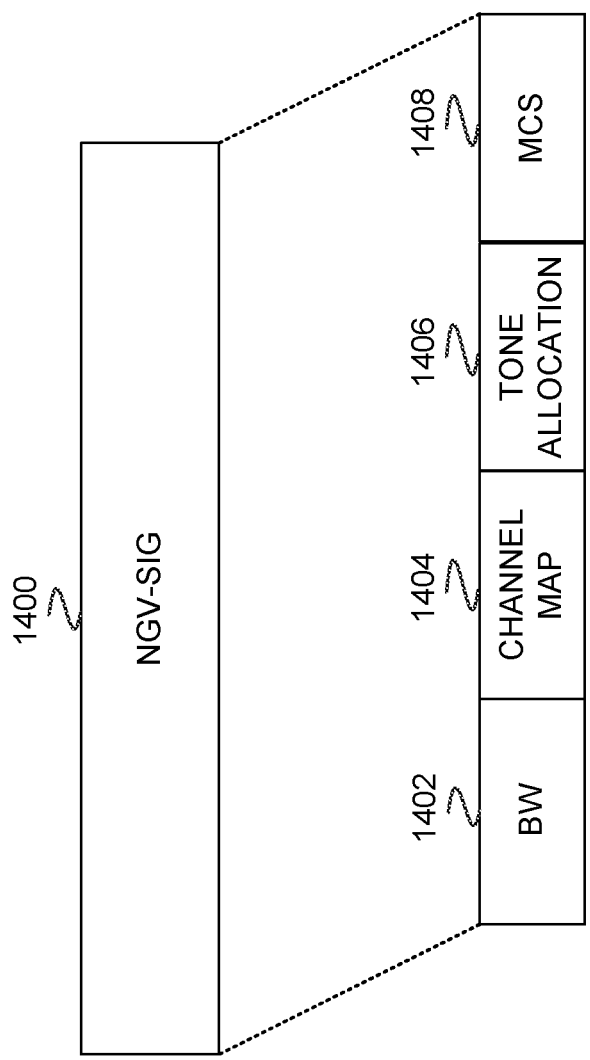
FIG. 14 illustrates a NGV SIG, in accordance with some embodiments.

FIG. 14 illustrates a NGV SIG 1400, in accordance with some embodiments. Illustrated in FIG. 14 is NGV-SIG 1400 that comprises a bandwidth (BW) field 1402, a channel map 1404, tone allocation field 1406, and MCS 1408. Each of the fields BW 1402, channel map 1404, and tone allocation 1406 may be optional and/or not a field of the NGV-SIG 1400. The NGV-SIG 1400 may be termed a BD-SIG or another name.

NGV-SIGs 908, 922, 1108, 1122, 1216, 1230, 1316, and 1324 may be an embodiment of NGV SIG 1400. The BW field 1402 may indicate a BW for a PPDU. For example, NGV-SIG 908, 922, 1108, 1122 may indicate 20 MHz. NGV-SIG 1216, 1230, 1316, 1324 may indicate 20 MHz. In some embodiments, BW field 1402 may indicate 30 MHz (or up to 70 MHz) and may indicate that one of the channels will be separately transmitted. In some embodiments, the BW field 1402 may indicate a location of the channels 802 to be used to transmit on by the AP 502 or STA 504. For example, if there is an indication of a primary channel, then the BW field 1402 may indicate which channels 802 are to used to transmit on based on the primary channel, e.g., primary channel and one secondary channel, primary channel, and two secondary channels.

The channel map field 1404 may indicate which channel 802 the PPDU is to be transmitted on. For example, NGV-SIG 908, 922, may include a seven bits with the primary channel 926 and secondary channel 924 bit indicated (e.g., a 1) as being used to transmit the PPDU. The receiving STA 504 or AP 502 would then know on which channels 802 to receive the PPDU 900. NGV-SIG 1108, 1122 may include a channel map field 1404 that indicate primary channel 1126 and secondary channel 1124. NGV-SIGs 1216, 1230 may include channel map fields 1404 that may indicate the primary channel 1126 and secondary channel 1124, respectively. In some embodiments, the channel map fields 1404 may indicate both primary channel 1126 and secondary channel 1124 even though the PPDUs 1100, 1150 are separately encoded. NGV-SIG 1216, 1230 may include channel map fields 1404. The channel map fields 1404 may indicate the 10 MHz channel the PPDU 1250, 1275 is being transmitted on or may indicate all the channels that are being used to transmit the PPDUs 1200, 1250, 1275, primary channel 1200, secondary channel 1240, and secondary channel 2 1242, respectively.

NGV-SIGs 1316, 1324 may include channel map fields 1404 that may indicate the secondary channel 1 1334 and secondary channel 2 1336. In some embodiments, the channel map fields 1404 may indicate both primary channel 1332, secondary channel 1 1334, and secondary channel 2 1336 even though the PPDUs 1300, 1350 are separately encoded.

Tone allocation field 1406 may indicate a tone pattern or allocation for the PPDU or PPDUs that are transmitted. For example, the tone allocation of PPDU 900 may be different from the tone allocation for PPDUs 1100, 1150 as the tone allocation for PPDU 900 may include the use of tones between the primary channel 1126 and secondary channel 1124. The tone allocation may be based on a communication protocol standard (e.g., IEEE 802.11bd or NGV), e.g., an AP 502 and/or STA 504 may determine from a communication protocol standard the tone allocation based on a size of the bonded channel and location of the bonded channel. NGV-SIG 1400 may include a dynamic assignment (not illustrated) of a primary channel and one or more secondary channels to channels 802.

In some embodiments, the NGV-SIG 1400 (or another field of the PPDU) may include an indication of whether channel bonding and/or 20 MHz operation is permitted. The indication of whether channel bonding and/or 20 operation is permitted may include a timeout or an indication of a duration when channel bonding and/or 20 MHz operation is not permitted. In some embodiments, a message is sent to indicate that channel bonding is permitted.

The indication of whether channel bonding is permitted would be sent by an AP 502 or STA 504 (e.g., integrated in a Road Side Unit) that when detected by other devices wanting to use channel bonding would only allow use of 10 MHz channels in the presence of the device sending this indication of whether channel bonding is permitted. Additionally, the indication of whether channel bonding operation is permitted could include features beyond just disallow, but include a timer or a region attribute. In the case of the timer, the devices wishing to use channel bonding must defer to 10 MHz only channels for a time duration. Upon not hearing the indication not to use channel bonding again, they would be able to start using channel bonding. For added protection, STAs 504 and AP 502 that use channel bonding would be required to monitor each 10 MHz channel for the indication of whether channel bonding is permitted, in accordance with some embodiments. Additionally, the indication of whether channel bonding is permitted may include a region indication. Thus, within the region indicated, APs 502 and STAs 504 would not be permitted to use channel bonding if the indication of whether channel bonding is permitted indicated that channel bonding is not permitted with a given region, e.g., the indication of whether channel bonding operation is permitted may include a location and a range (or just range with the receiving AP 502 or STA 504 estimating the location.) In some embodiments, even if channel bonding is not permitted, the AP 502 and STA 504 may use multiple 10 MHz channels, but not with 20 MHz modulation.

Having the timer or region based approach to the indication of whether channel bonding is permitted allows the AP 502 and STA 504 to reduce signaling overhead by sending the indication of whether channel bonding is permitted less frequently. The indication of whether channel bonding is permitted could be sent as a higher layer message or using the NGV SIG 1400, e.g., another field may be included in the NGV SIG 1400 such as bonded permitted. Not permitting the channel bonding and/or 20 MHz operation may enable better operation with legacy devices, e.g., IEEE 802.11p, since the legacy devices may not be able to decode the 20 MHz operation PPDUs and the 20 MHz PPDUs may interfere with 10 MHz legacy PPDUs being transmitted on a same channel 802.

In some embodiments, the NGV SIG 1400 may be the same or similar as a HT or VHT SIG with fields that may be used to indicate one or more of BW field 1402, channel map 1404, and/or tone allocation 1406, as well other indicates such as whether channel bonding is permitted and an indication of a primary channel. The MCS field 1408 indicates a modulation and coding scheme used to encode the data portion of the PPDU comprising the NGV-SIG 1400, e.g., data field 914, 1008, 1016, 1114, 1122, 1222, 1236, and 1330.

Figure 15:
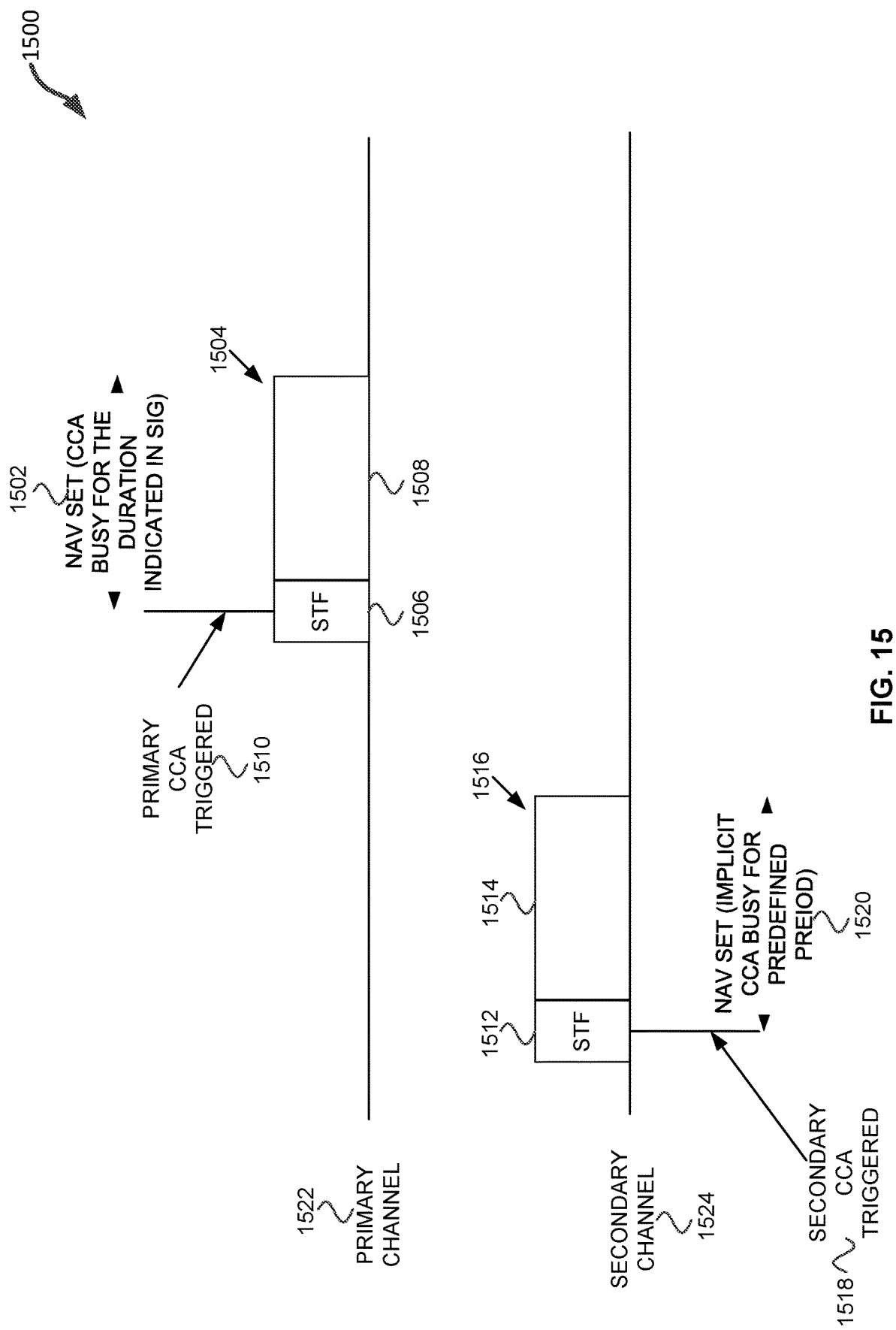
FIG. 15 illustrates network allocation vector (NAV) setting, in accordance with some embodiments.

FIG. 15 illustrates network allocation vector (NAV) setting, in accordance with some embodiments. Illustrated in FIG. 15 is NAV set 1502, PPDU 1504, STF 1506, remainder of PPDU 1508, primary CCA triggered 1510, STF 1512, remainder of PPDU 1514, PPDU 1516, secondary CCA triggered 1518, NAV set 1520, primary channel 1522, and secondary channel 1524.

The primary channel 1522 and secondary channel 1524 may be channels 802 as disclosed in conjunction with FIG. 8. The primary channel 1522 may be indicated in a PPDU or may be predefined based on communication protocol standard (e.g., IEEE 802.11bd). In some embodiments, the primary channel is indicated by a high-layer in the communication protocol for a transmission on which the STA 504 initiates the access.

An AP 502, STA 504, and/or legacy device 506 may receive the PPDU 1504. A clear channel assessment (CCA) of the AP 502, STA 504, and/or legacy device 506 may determine at primary CCA trigger 1510 that the channel is busy during the reception of STF 1506. The CCA assessment may be based on an energy level or signal detect level based on the radio frequency (RF) medium being sensed by the AP 502 and/or STA 504. The AP 502, STA 504, and/or legacy device 506 may set a NAV of the AP 502, STA 504, and/or legacy device 506 to be busy for a duration of the PPDU 1504 as indicated by a L-SIG, e.g., L-SIG 906, 1006, 1106, 1206, 1306.

An AP 502 and/or STA 504 may receive the PPDU 1516. A CCA of the AP 502 and/or STA 504 may determine at secondary CCA trigger 1518 that the channel is busy during the reception of STF 1512. The AP 502 and/or STA 504 may set a NAV of the AP 502 and/or STA 504 to be busy for a predetermined duration. For example, the duration may be based on a common type of PPDU, e.g., basic safety messages that are 300B long and are modulated with the most protected modulation and coding scheme (MCS).

In some embodiments, the AP 502 and/or STA 504 are configured to perform a MAC channel access protocol where an AP 502 or STA 504 that operates on a 20 MHz channel has a primary 10 MHz channel and one or more secondary 10 MHz channels. The AP 502 or STA 504 monitors the CCA and NAV on the primary channel and decrements its backoff during idle periods when the NAV equals 0. When the backoff reaches zero, the AP 502 or STA 504 may transmit on the primary 10 MHz channel. If short interframe space (SIFS) time (or another time, e.g., PIFS, DIFS, AIFS[EDCA class]), etc.) before reaching the backoff of zero, the secondary channel or channels energy detection CCA is idle, the STA is allowed to transmit on the wider channel, i.e., the primary channel and the one or more secondary channels. In some embodiments, the AP 502 and/or STA 504 includes sensors so that the AP 502 and/or STA 504 can monitor two or more 10 MHz channels separately. In some embodiments, the AP 502 and/or STA 504 monitor a primary channel and when a backoff counter is 0, they turn to a secondary channel they want to use to transmit on too and if that secondary channel is not busy for a SIFS duration (or another duration), then the AP 502 and/or STA 504 may use both the primary channel and the secondary channel.

The duplicate preamble (e.g., as disclosed in FIGS. 9, 10, 11, 12, 13) on the two or more 10 MHz channels allows coexistence with legacy device 506 (e.g., IEEE 802.11p devices), which will decode the duplicated preambles and defer during the PPDU reception based on the duration field in the L-SIG, e.g., L-SIG 906, 920, 1006, 1014, 1106, 1120, 1206, 1214, 1228, 1306, 1314, 1322).

In some embodiments, the AP 502 and/or STA 504 may be configured to perform mid-packet detection to improve the sensitivity of the energy detection to improve protection for the secondary channel. For example, the mid-packet detection may detect a PPDU being transmitted on the secondary channel by another AP 502, STA 504, and/or legacy device 506, and by performing mid-packet detection the AP 502, STA 504, and/or legacy device 506 may avoid transmitting on the secondary channel and interfering with the other transmission.

In some embodiments, the sensitivity for CCA may be adjusted. In some embodiments, the sensitivity for CCA on the secondary channels may be −75 dBm, which is 10 dB above the minimum sensitivity threshold of −85 dBm permitted in IEEE 802.11p. The minimum sensitivity by APs 502, STA 504, and/or legacy devices 506 may be −90 to −95 dBm.

In some embodiments, a lower threshold is used by APs 502 and/or STAs 504 to improve the sensitivity of the secondary channel detection by improving mid-packet detection. In some embodiments, APs 502 and/or STAs 504 are configured to perform parallel STF detections on two channels independently, e.g., primary and secondary channels. In some embodiments, an AP 502 and/or STA 504 is configured so it can issue two physical (PHY)-CCA.indications, one for each channel, with the CCA on each channel being made of energy detection CCA and preamble/STF detection CCA. In some embodiments, a CCA on the secondary channel, e.g., based on a SIG field is detected when it would not have been with only the capability to perform CCA on one channel. In some embodiments, an AP 502 and/or STA 504 set a NAV or protect for a duration of the PPDU detected on the channel. In some embodiments, the AP 502 and/or STA 504 may assume that if the auto-correlation of the STF signal on the secondary channel triggers a detection, the CCA becomes busy for a pre-determined period. This period shall correspond to the average PPDU duration on the channel, in accordance with some embodiments. This duration should be relatively constant, as most of the MAC Protocol Data Units (MPDUs) are BSMs that are 300B long, and are modulated with the most protected MCS. The lowering of the threshold used by the AP 502 and/or STA 504 may improve the coexistence on the secondary channels with legacy devices 506.

In some embodiments, the PPDU length is fixed for legacy devices 506 transmitting PPDUs. The NAV of the APs 502 and/or STAs 504 may be set based on the fixed length of the PPDUs when a PPDU is detected on a secondary channel.

In some embodiments, where the primary channel does not need to be known by the receiver of the PPDU(s), the transmitter (e.g., AP 502 and/or STA 504) can choose its primary channel among possible channels 802. If the AP 502 and/or STA 504 has the capability to do Enhanced Distributed Channel Access (EDCA) contention in parallel on different channels 802, and has a Backoff counter per channel 802, the AP 502 and/or STA 504 can dynamically change the primary channel to choose a primary channel as the one on which the EDCA counter reaches zero first. The other channels become secondary channels, where the AP 502 and/or STA 504 may include secondary channels based on whether they are clear a PIFS or SIFS duration before the primary channel becomes available.

In some embodiments, the AP 502 and/or STA 504 does not need to know what the primary channel is, as long as it can receive on all the channels simultaneously. For example, based on multi-channel operation as disclosed in 1609 communication protocol standards. Instead of signaling the BW of the PPDU, and deriving the modulated channels based on the BW and the knowledge of the primary channel, the transmitter (e.g., AP 502 and/or STA 504) encodes the SIG field (e.g., NGV-SIG 1400) of the PPDU to include explicit information of the channels used to transmit one or more PPDUs, e.g., channel map 1404. In another embodiment, the BW field 1402 may include a combination of bits that cover all possible cases or modulated channels.

In some embodiments, the primary channel 802.5 can be fixed, e.g., CCH, or can be dynamically changed and announced as part of a service advertisement. For example, an AP 502 and/or STA 504 may transmit a service advertisement that indicates which channel 802 should be used as the primary channel.

In some embodiments, the data field 914, 1008, 1016, 1114, 1122, 1208, 1222, 1236, 1308, 1330 comprises a PSDU that is transmitted over all the channels 802 (or at least two of the bonded channels) where the PSDU comprises a single MPDU or aggregated (A)-MPDU (or MSDU or A-MSDU) coming from the MAC layer and is encoded with a single encoder and modulated with the same MCS across channels.

In some embodiments, all or some channels 802 are modulated with a specific MPDU or A-MPDU, meaning that there can be multiple MAC flows that are modulated independently (channel coder and modulation) and transmitted in parallel over different channels, but sharing inverse Fast Fourier Transform (iFFT). For example, secondary channel 1 1240 and secondary channel 2 1242 may be modulated with different MPDUs or A-MPDUs.

In some embodiments, the NGV-SIG 1400 may include a field to indicate the type of modulation is being used, e.g., whether a single chain from the MAC is being used or two or more chains are being used from the MAC. In some embodiments, a mixture of single modulation and multiple modulation may be used and the field in the NGV-SIG 1400 may indicate the type for the channels 802 being used to transmit on. For example, some channels 802 may have a self-contained PPDU that is transmitted within the channel 802 (e.g., primary channel 1332) and other channels may have MPDUs or A-MPDUs that are transmitted over two or more channels 802, e.g., data field 1330 is transmitted over two channels secondary channel 1 1334 and secondary channel 2 1336. In some embodiments, receiving data 1308 may be sufficient to reconstruct the MPDU and on other channels a bonded PPDU is transmitted across multiple channels, which can be received by receiving all these channels, e.g., secondary channel 1 1334 and secondary channel 2 1336. In some embodiments, the bonded channels do not have to be contiguous.

In some embodiments, a single MAC flow (e.g., MPDUs) is modulated over all channels, and one where each channel is modulated with one separate MAC flow (which will go through a specific encoder per channel).

Figure 16:
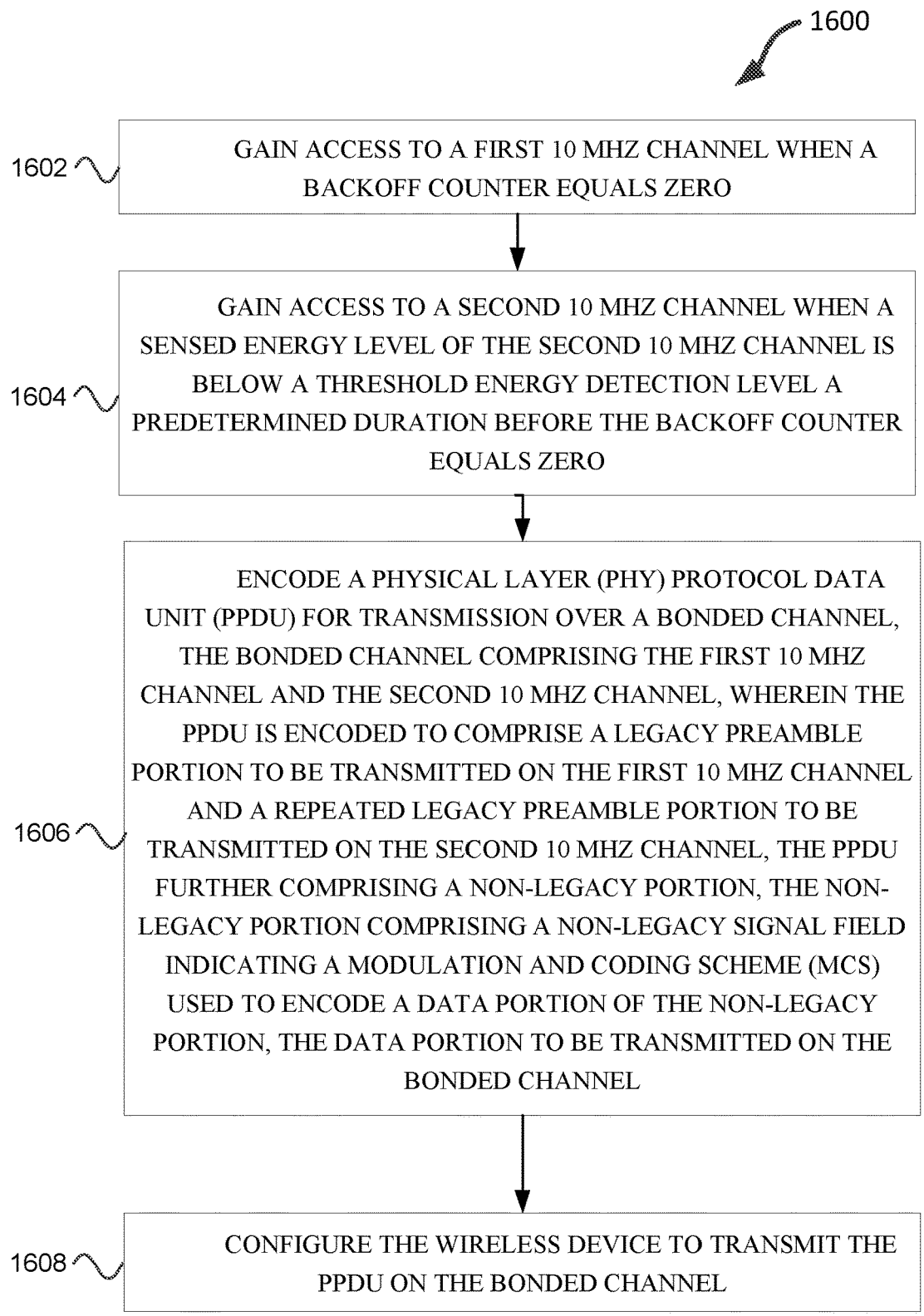
FIG. 16 illustrates a method for channel bonding and bonded channel access, in accordance with some embodiments.

FIG. 16 illustrates a method 1600 for channel bonding and bonded channel access, in accordance with some embodiments. The method 1600 begins at operation 1602 with gain access to a first 10 MHz channel when a backoff counter equals zero. The method 1600 continues at operation 1604 with gain access to a second 10 MHz channel when a sensed energy level of the second 10 MHz channel is below a threshold energy detection level a predetermined duration before the backoff counter equals zero.

For example, AP 502 or STA 504 may gain access to two channels 802 as disclosed in conjunction with FIG. 15 and herein. The method 1600 may continue at operation 1606 with encoding a PPDU for transmission over a bonded channel, the bonded channel comprising the first 10 MHz channel and the second 10 MHz channel, where the PPDU is encoded to comprise a legacy preamble portion to be transmitted on the first 10 MHz channel and a repeated legacy preamble portion to be transmitted on the second 10 MHz channel, the PPDU further comprising a non-legacy portion, the non-legacy portion comprising a non-legacy signal field indicating a MCS used to encode a data portion of the non-legacy portion, the data portion to be transmitted on the bonded channel. For example, an AP 502 and/or STA 504 may encode a PPDU as described in conjunction with FIGS. 9 and 13 with a NGV-SIG 1400 as described in conjunction with FIG. 14.

The method 1600 may continue at operation 1608 with configuring the wireless device to transmit the PPDU on the bonded channel. For example, an apparatus of an AP 502 or STA 504 may configure the AP 502 or the STA 504 to transmit a PPDU as disclosed in FIGS. 8-15. Method 1600 may be performed in a different order. Method 1900 may include one or more additional operations. One or more of the operations of method 1900 may be optional.

Figure 17:
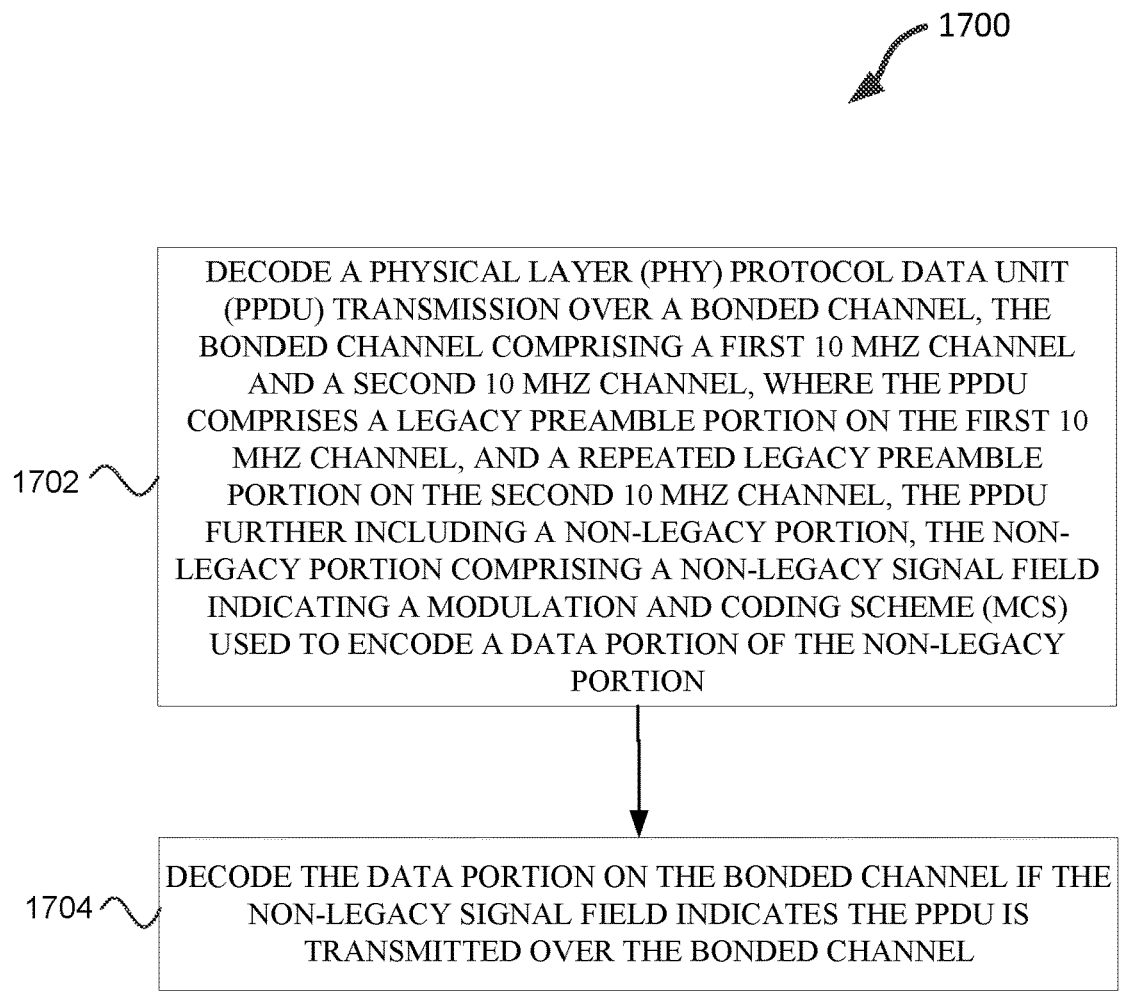
FIG. 17 illustrates a method for channel bonding and bonded channel access, in accordance with some embodiments.

FIG. 17 illustrates a method 1700 for channel bonding and bonded channel access, in accordance with some embodiments. The method 1700 may begin at operation 1702 with decoding a PPDU over a bonded channel, the bonded channel comprising a first 10 MHz channel and a second 10 MHz channel, where the PPDU comprises a legacy preamble portion on the first 10 MHz channel, and a repeated legacy preamble portion on the second 10 MHz channel, the PPDU further comprising a non-legacy portion, the non-legacy portion comprising a non-legacy signal field indicating a MCS used to encode a data portion of the non-legacy portion.

The method 1700 may continue at operation 1704 with decoding the data portion on the bonded channel if the non-legacy signal field indicates the PPDU is transmitted over the bonded channel. For example, an apparat of an AP 502 or STA 504 may decode the data field 914, 1008, 1016, 1114, 1122, 1222, 1236, and 1330.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:
    memory; and
    processing circuitry coupled to the memory, the processing circuitry configured to:
    sense an energy level from a first 10 MHz;
    gain access to the first 10 MHz channel when a backoff counter equals zero;
    decrease the backoff counter by one when the energy level is below a first threshold energy detection level for a first predetermined duration,
    wherein a second threshold energy detection level is less than or equal to the first threshold energy detection level;
    gain access to a second 10 MHz channel when a sensed energy level of the second 10 MHz channel is below the second threshold energy detection level a predetermined duration before the backoff counter equals zero;
    encode a physical layer (PHY) protocol data unit (PPDU) for transmission over a bonded channel, the bonded channel comprising
    the first 10 MHz channel and the second 10 MHz channel, wherein the PPDU is encoded to comprise
    a legacy preamble portion to be transmitted on the first 10 MHz channel and a repeated legacy preamble portion to be transmitted on the second 10 MHz channel, the PPDU further comprising a non-legacy portion, the non-legacy portion comprising
    a non-legacy signal field indicating a modulation and coding scheme (MCS) used to encode a data portion of the non-legacy portion, the data portion to be transmitted on the bonded channel; and
    configure the wireless device to transmit the PPDU on the bonded channel.

2. The apparatus of claim 1, wherein the processing circuitry is further configured to:
    encode the non-legacy signal field to comprise a channel map field, the channel map field comprising an indication that the PPDU is to be transmitted on the first 10 MHz channel and the second 10 MHz channel.

3. The apparatus of claim 1, wherein the processing circuitry is further configured to:
    encode the non-legacy signal field on the first 10 MHz channel and a repeated non-legacy signal field on the second 10 MHz channel.

4. The apparatus of claim 1, wherein the processing circuitry is further configured to:
    gain access to a third 10 MHz channel;
    encode another PPDU for transmission over the third 10 MHz channel, wherein the another PPDU is encoded to comprise another legacy preamble portion to be transmitted on the third 10 MHz channel, the another PPDU further comprising another non-legacy portion, the another non-legacy portion comprising another non-legacy signal field indicating another MCS used to encode another data portion of the another non-legacy portion, the another data portion to be transmitted on the third channel; and configure the wireless device to transmit the another PPDU on the third channel simultaneously with the PPDU on the bonded channel.

5. The apparatus of claim 4, wherein the processing circuitry is further configured to:
   receive a media access control (MAC) service data unit (MSDU); and
   encode the PPDU and the another PPDU to comprise the MSDU.

6. The apparatus of claim 1, wherein the processing circuitry is further configured to:
   receive a first media access control (MAC) service data unit (MSDU) and a second MSDU; and
   encode the PPDU to comprise the first MSDU and the second MSDU.

7. The apparatus of claim 1, wherein the processing circuitry is further configured to:
   decode a third PPDU, the third PPDU comprising an indication of a primary channel, and wherein the first 10 MHz channel is the primary channel.

8. The apparatus of claim 1, wherein the predetermined duration is a short interframe space (SIFS), Distributed Coordination Function (DCF) interframe spacing (DIFS), or Point coordination function (PCF) interface spacing (PIFS).

9. The apparatus of claim 1, wherein the first 10 MHz channel is a primary channel and wherein the non-legacy signal field comprises a bandwidth field, the bandwidth field indicating the first 10 MHz channel and the second 10 MHz channel.

10. The apparatus of claim 1, wherein encode the PPDU for transmission over the bonded channel further comprises:
   determine a tone allocation for the first channel and the second channel; and
   encode the PPDU for transmission over the bonded channel based on the tone allocation.

11. The apparatus of claim 1, wherein the processing circuitry comprises a field-programmable gate array (FPGA).

12. The apparatus of claim 1, wherein the processing circuitry comprises one or more application specific integrated circuits (ASICs).

13. The apparatus of claim 1, wherein the wireless device is configured to operate in accordance with one or more from the following group: Institute of Electrical and Electronic Engineers (IEEE) 802.11bd, IEEE 802.11p, and IEEE 802.11, and wherein the wireless device is a station (STA) or an access point (AP).

14. A non-transitory computer-readable storage medium that stores instructions for execution by one or more processors of an apparatus of a wireless device, the instructions to configure the one or more processors to:
   sense an energy level from a first 10 MHz;
   gain access to the first 10 MHz channel when a backoff counter equals zero;
   decrease the backoff counter by one when the energy level is below a first threshold energy detection level for a first predetermined duration,
   wherein a second threshold energy detection level is less than or equal to the first threshold energy detection level;
   gain access to a second 10 MHz channel when a sensed energy level of the second 10 MHz channel is below the second threshold energy detection level a predetermined duration before the backoff counter equals zero;
   encode a physical layer (PHY) protocol data unit (PPDU) for transmission over a bonded channel, the bonded channel comprising
   the first 10 MHz channel and the second 10 MHz channel, wherein the PPDU is encoded to comprise
   a legacy preamble portion to be transmitted on the first 10 MHz channel and a repeated legacy preamble portion to be transmitted on the second 10 MHz channel, the PPDU further comprising a non-legacy portion, the non-legacy portion comprising a non-legacy signal field indicating a modulation and coding scheme (MCS) used to encode a data portion of the non-legacy portion, the data portion to be transmitted on the bonded channel; and
   configure the wireless device to transmit the PPDU on the bonded channel.

15. The non-transitory computer-readable storage medium of claim 14, wherein the instructions further configure the one or more processors to:
   decrease a value of a backoff counter when the first energy level is below a first energy detection level and a network allocation vector (NAV) for the first 10 MHz channel indicates not busy;
   if the value of the backoff counter is zero, sense a second energy level of the second 10 MHz channel, and determine the second channel is not busy when the second energy level is below a second energy detection level, wherein the first energy detection level is higher than the second energy detection level; and wherein gain access to a first 10 MHz channel and to a second 10 MHz channel further comprises:
   gain access to the first 10 MHz channel and the second 10 MHz channel, if the backoff counter is zero and the second channel is not busy for a predetermined duration short interframe space (SIFS) before the counter is zero.

16. The non-transitory computer-readable storage medium of claim 15, wherein the instructions further configure the one or more processors to:
   if the second energy detection level is above the second energy detection level, set a NAV for the second 10 MHz channel to a predetermined value.

17. The non-transitory computer-readable storage medium of claim 15, wherein gain access to the first 10 MHz channel and the second 10 MHz channel further comprises:
   simultaneously sense signals from the first 10 MHz channel and the second 10 MHz channel;
   decrease a first backoff counter by one when the first 10 MHz channel has been not busy for a predetermined period of time;
   decrease a second backoff counter by one when the first 10 MHz channel has been not busy for a predetermined period of time;
   gain access to the first 10 MHz channel when the first backoff counter equals zero; and
   gain access to the second 10 HMZ channel when the second backoff counter equals zero.

* * * * *